Dec. 24, 1935.    E. KRAMAR    2,025,212
RADIO TRANSMITTING ARRANGEMENT FOR DETERMINING BEARINGS
Filed July 10, 1934
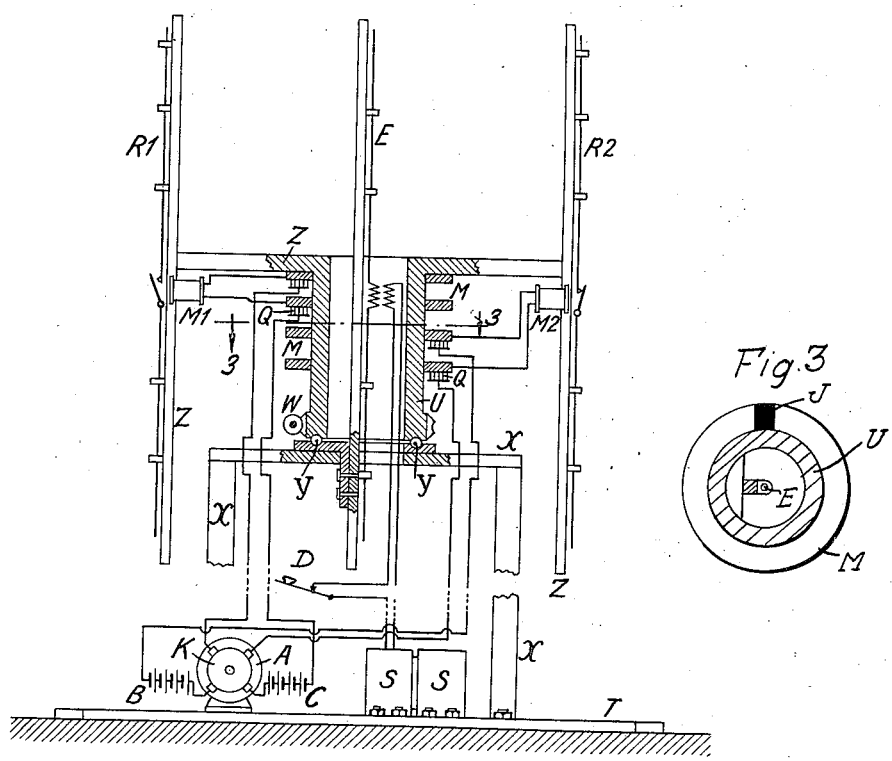
Fig. 1
Fig. 3
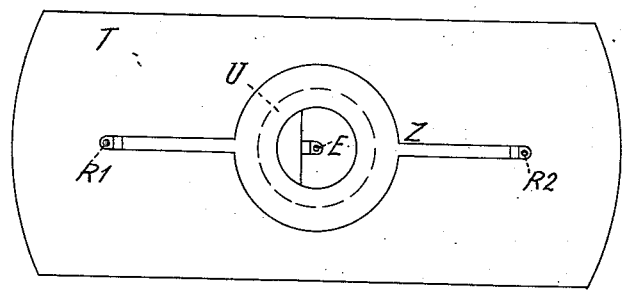
Fig. 2
Inventor:
Ernst Kramar
by R. C. Hopgood
Attorney Patented Dec. 24, 1935

2,025,212

UNITED STATES PATENT OFFICE 2,025,212

RADIO TRANSMITTING ARRANGEMENT FOR DETERMINING BEARINGS

Ernst Kramar, Berlin-Tempelhof, Germany, assignor to C. Lorenz Aktiengesellschaft, Berlin-Tempelhof, Germany, a company Application July 10, 1934, Serial No. 734,449
In Germany July 13, 1933

3 Claims. (Cl. 250—11)

This invention relates to directional radio transmitting arrangements for use in determining bearings.

In my copending patent application Ser. No. 638,907 filed October 21, 1932 it is proposed for the purpose of obtaining bearings by means of differently directed alternately transmitted emissions, as for example according to the $a$-$n$-method, to feed an energizer antenna continuously from a high frequency generator and to key or manipulate a reflector structure. By this means the circular radiation diagram of the energizer antenna is alternately deformed in two opposite directions, so that a comparison of field intensities may be made. The arrangement has the advantage of great simplicity.

In accordance with the present invention the reflector structure of this prior transmitting arrangement is adapted to be rotated for the purpose of carrying out the well-known method of direction finding by means of a rotating line of equal field intensity. A line of equal field intensity may be defined as the line upon which a station receives a continuous dash signal from the joint reception of two directional transmissions keyed in a well-known manner in accordance with the $a$-$n$-method, or alternatively one keyed to transmit dots and the other dashes, the dashes from one transmission filling in the spaces between the dots from the other.

The invention will be understood from the following description, reference being made to the accompanying drawing in which:

Fig. 1 is a partially sectional schematic elevation of an embodiment of the modified transmitting arrangement, Fig. 2 is a plan thereof, and Fig. 3 is a sectional view on line 3—3 of Fig. 1.

The device comprises three perpendicular dipoles E, R1, R2, disposed in the same plane. The dipole E is connected to a high frequency generator S. The dipoles R1, R2 are interrupted in the middle and are adapted to be closed by a relay M1 or M2. These relays are alternately energized and deenergized by a commutator K, which is driven by a motor A. It is assumed in the drawing that the dipole R1 is opened and therefore inactive, and the dipole R2 closed and thus active. Direct current sources B, C serve to feed the relays M1, M2 over contact brushes Q and slip rings M.

The parts R1, R2, M1, M2, M, Q are carried by a platform Z which is supported by means of a sleeve U and ball bearings Y on a frame X, and is adapted to be rotated by a worm gear W.

The advantages of this arrangement are explained in the following description.

It is first pointed out that a rotating line of equal field intensity may advantageously be employed wherever the determination of a certain course is impracticable by means of beacons or the like on account of the fact that the radiating destination should be approachable in this way from all directions. In such systems it is well-known to cause a line of equal field intensity to rotate and for a receiving station to determine its compass bearing from the transmitting station by measuring the period of rotation of the guiding line from a predetermined starting point, preferably from the north. With known arrangements of this type the whole antenna system is fixed, and goniometer arrangements are rotated by which the directional antenna systems are suitably provided with energy. This method is not always convenient to carry out because difficulties are frequently encountered in transmitting the energy in all the angular positions of the goniometer correct both in phase and amplitude.

The transmitting arrangement disclosed in my said copending application is particularly suitable for carrying out methods of the previously-described type, since it is only necessary to rotate the reflectors R1 and R2. The energized antenna E remains stationary and can be fed uninterruptedly with high frequency current. The rotation of the reflectors R1 and R2 offers no difficulties as no high frequency energy needs to be supplied to them and only the control currents flowing over brushes Q and slip rings M are conveyed to the relays M1, M2.

The principle described in my said copending application is moreover particularly suitable for providing a rotating line of equal field intensity, because the side determination is made distinct. With the known beacon arrangements, as is well-known, there are four quadrants and the same number of lines of equal field intensity, that is two planes of equal field intensity exist and consequent ambiguity may arise. With the method according to my said copending application there is only one plane of equal field intensity; on the right hand side one signal belongs and on the left hand side the other signal. If only one plane of equal field intensity is caused to rotate, then, of course, errors are less easy to occur than in the case of two such planes. In order to improve the known arrangements, it has been proposed to employ antenna arrangements operating on one side only, but these have the disadvantage that they introduce complications which do not exist with the arrangement according to my said copending application.

The novel arrangement also enables the distinctive designation, usually necessary in direction-finding by means of a rotating directional radiation, to be transmitted in a particularly simple manner.

In order to determine the position, in the known methods operating with a rotating line of equal field intensity, a non-directional signal designation is given when the line of equal field intensity passes through a predetermined bearing. Usually the north passage of this line is designated. With the transmitting arrangement of my said copending application this designation may be given in a simple manner by putting the reflector arrangement R1, R2 out of action and causing the energizing antenna to radiate non-directionally. It is then only necessary for this brief interval to key the high frequency current or the transmitter feeding the energizing antenna E in accordance with a predetermined combination of letters. In order to obtain this non-directional transmission at a certain period during the rotation of the reflectors R1 and R2, the circuits of magnets M1 and M2 are simultaneously opened. This may be carried out in the manner illustrated in Fig. 3 wherein the section through the arrangement of line 3—3 of Fig. 1, is shown. Each slip ring M is interrupted by insulator J inserted therein and is so positioned that the brushes Q simultaneously rest on the respective insulators. Thus, the circuits for the magnets may be opened independent of the position of the interrupter K, whereby the exciter antenna E is functional in a non-directional manner, the reflectors R1 and R2 being temporarily out of commission. During the said period, keying of the high frequency and exciter antenna E may be accomplished by means of the key D or other appropriate means for the purpose of transmitting special signals during said period. As soon as the transmission of that designation is finished, the energizing antenna is again fed constantly and the reflector arrangement is brought into action. The position of the receiving station can then be determined from the time difference between the reception of the designation and the arrival of the rotating line of equal field intensity at the receiving station.

In order to simplify the calculation as far as possible, it is advantageous to place the transmitted signals in their time interval in relation to the speed of rotation of the line of equal field intensity. A stop clock or other time measuring device, which measures the interval of time between the reception of the north designation and the arrival of the line of equal field intensity, then becomes unnecessary.

Preferably the dots of the signals transmitted are suitably arranged in their time distance whereby the dashes, of course, have the same intervals, but in the reception the predominance of the dots is used, as they are more easily counted than the dashes. If, for example, a dot is transmitted, when the line of equal field intensity is advanced by 5°, and if, for example, ten dots are counted between the north designation and the arrival of the line of equal field intensity at the receiving station, then it is clear from this that the line of equal field intensity has in the meantime rotated by 10×5°=50°, whereby the point of the compass is at once determined without the necessity for a stop clock at the receiving station.

The method is particularly suitable for the reason also that the arrival of the continuous dash is very well observed through the gradual intermerging of the signals and thus the maximum can easily be established. It is an advantage to perform the counting two or three times and in order to eliminate errors to use the average value.

The numerical example stated in which a dot is given at every 5°, is quite sufficient in practice as the method is mainly intended for use over substantial distances, for example when flying toward an aerodrome. Here, in the first instance, the approximate direction is sufficient, since in the vicinity of the aerodrome other well-known auxiliary means, such as landing beacons and the like, come into effect.

What is claimed is:

1. In a radio transmitting arrangement for use in determining bearings, comprising a main antenna, a high frequency generator coupled thereto, a reflecting antenna on either side of said main antenna and so disposed with respect thereto as to produce a zone common to the radiations reflected from said reflecting antennae, a rotatable frame carrying said reflecting antennae disposed concentrically with respect to said main antenna, and means for rendering said reflecting antennae alternately effective and ineffective so that one is ineffective whilst the other is effective to reflect the radiations from said main antenna thereby to produce in said zone a field of equal intensity, the periods of effectiveness and ineffectiveness of the respective reflecting antennae being different and so related that along the bi-sector of said zone of equal field intensity an uninterrupted wave field exists.

2. A radio transmitting arrangement according to claim 1, wherein said means comprises keying means for the separate reflecting antennae and wherein means is provided for operating said keying means automatically in predetermined relation to the speed of rotation of said reflecting antennae.

3. A transmitting arrangement in accordance with claim 1, characterized by the provision of means for rendering both reflecting antennae simultaneously ineffective for a pre-determined period during rotation of said reflecting antennae and further by the provision of means for keying said main antenna during said period.

ERNST KRAMAR.